(No Model.)

W. H. WOOD.
CADDY.

No. 494,093. Patented Mar. 21, 1893.

WITNESSES:
H. A. Carhart,
Geo. M. Blevers,

INVENTOR
Wm. H. Wood
By Smith & Denison
ATTORNEYS.

THE NORRIS PETERS CO., PHOTO-LITHO., WASHINGTON, D. C.

UNITED STATES PATENT OFFICE.

WILLIAM H. WOOD, OF ELMIRA, NEW YORK, ASSIGNOR OF ONE-HALF TO JOHN B. STANCHFIELD, OF SAME PLACE.

CADDY.

SPECIFICATION forming part of Letters Patent No. 494,093, dated March 21, 1893.

Application filed May 12, 1892. Serial No. 432,726. (No model.)

*To all whom it may concern:*

Be it known that I, WILLIAM H. WOOD, of Elmira, in the county of Chemung, in the State of New York, have invented new and useful Improvements in Caddies, of which the following, taken in connection with the accompanying drawings, is a full, clear, and exact description.

My invention relates to the construction of caddies, adapted for use in measuring teas, coffees, spices and other goods in powdered form.

My object is to produce an improved caddy, from which such goods may be readily taken and measured as taken; simple, cheap and durable in construction and of great utility.

My invention consists first in providing the body of the receptacle with a bottom, sloping toward the centrally scooping trough; second, in providing the trough with a gravity gate adapted to be raised by the inward movement of the scoop; third, in graduating the outer end of the scoop for the purpose of measuring the amount of material withdrawn; and in the several other novel features of construction and operation hereinafter described and which are specifically set forth in the claim hereto annexed. It is constructed as follows, reference being had to the accompanying drawings, in which—

Figure 1:
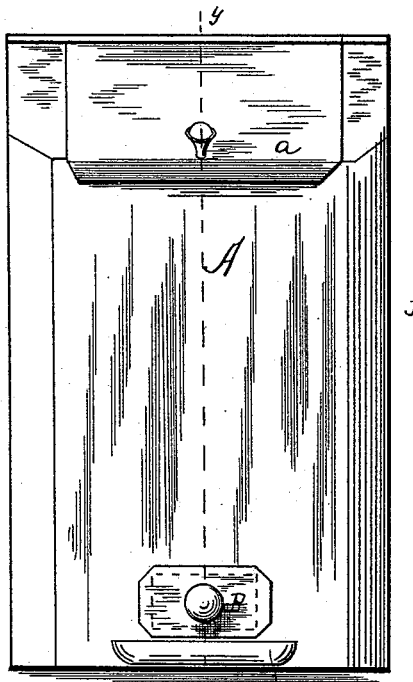
Figure 2:
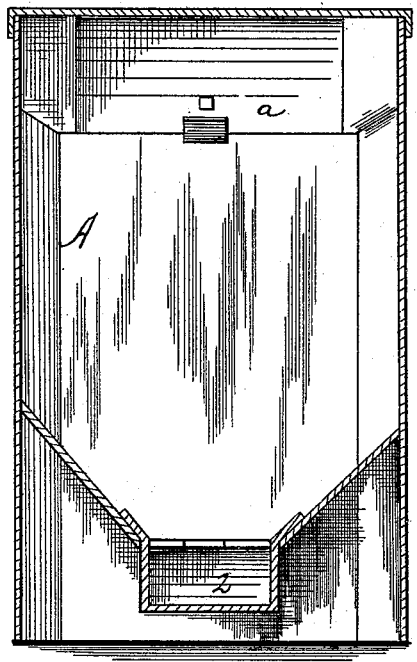
Figure 3:
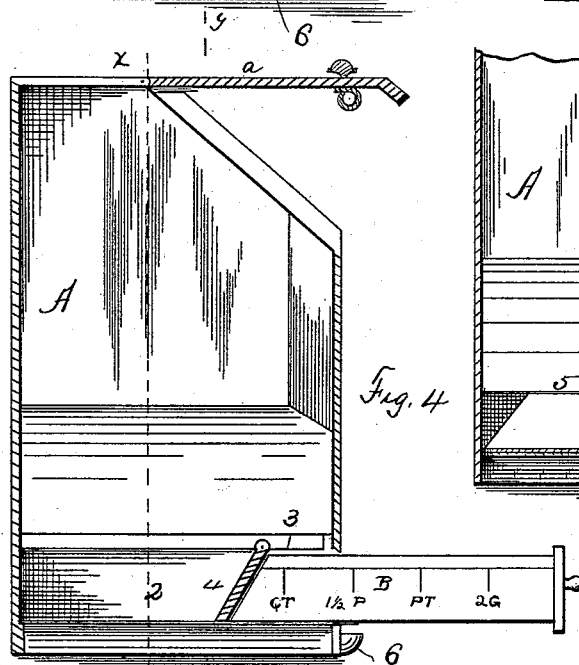
Figure 4:
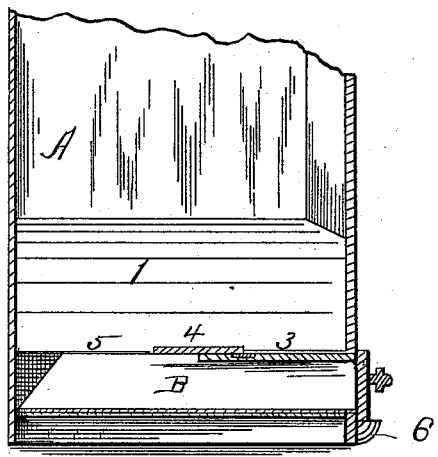

Figure 1, is a front view of the caddy complete, closed. Fig. 2, is a front vertical section on line x x Fig. 3. Fig. 3, is a side vertical section, on line y y, Fig. 1, the scoop being partly drawn out. Fig. 4, is a similar view of the lower portion of the caddy, with the scoop closed within the caddy.

A—, is the body constructed rectangular in form, or otherwise, as desired, and provided with a cover —a— having the sides —1—1— of the bottom sloping toward the scoop trough —2—, in which the scoop —B— travels. The front end of the trough is bridged over as shown at —3—; and —4— is a gate hinged at its inner end and adapted to be raised by the inward movement of the scoop; the object being to close the opening of the trough when the scoop is removed, thereby preventing the material from coming out.

It will be observed that when the scoop is inserted in the trough, it will first strike the gate as shown in Fig. 3, and then as it passes in will raise said gate to the position shown in Fig. 4 when the material will drop down through the opening —5— and fill, or partially fill the scoop. As the scoop is withdrawn the weight upon the gate will force it down where it will take the position shown in Fig. 3. The scoop may then be held vertically and the amount of its contents measured by means of the graduation upon its outer end.

Upon the front lower face of the body, I construct a catch-basin —6—, as shown.

What I claim is—

In a caddy, the combination with a box or casing A, having interiorly thereof inclined walls 1, 1, sloping toward the center, of the trough 2, located at the bottom of said inclines and provided with a bridging 3, and pivoted gate 4, the scoop B, having scale marking thereon and adapted to travel in said trough and the catch basin at the open end of the latter, substantially as and for the purpose set forth.

In witness whereof I have hereunto set my hand this 27th day of April, 1892.

WILLIAM H. WOOD.

In presence of—
EMMA D. WOOD,
ORLANDO M. SMITH.